United States Patent

[11] 3,615,193

| [72] | Inventor | Theodore B. Simpson |
| | | 910 Wardman Drive, Brea, Calif. 92621 |
| [21] | Appl. No. | 851,742 |
| [22] | Filed | Aug. 20, 1969 |
| [45] | Patented | Oct. 26, 1971 |
| | | Substitute for application Ser. No. 492,921, Oct. 4, 1965, now abandoned. |

[54] PRODUCTION OF PHOSPHORIC ACID
5 Claims, No Drawings

[52] U.S. Cl. .................................................. 23/165, 159/47
[51] Int. Cl. .................................................. C01b 25/18, C01b 25/16
[50] Field of Search .................................... 23/165 D, 165; 159/49

[56] References Cited
UNITED STATES PATENTS

| 3,361,187 | 1/1968 | Hudson et al. ................ | 159/49 |
| 3,420,627 | 1/1969 | Young .......................... | 23/165 |
| 3,453,074 | 7/1969 | Mustian ........................ | 23/165 |
| 3,457,036 | 7/1969 | Backlund ..................... | 23/165 |

Primary Examiner—Oscar R. Vertiz
Assistant Examiner—Gregory A. Heller
Attorney—Beehler & Arant ABSTRACT: In the evaporation of concentrated wet process phosphoric acid it is difficult to produce a concentrated acid having a low viscosity. If residence or retention times of 15 seconds to 1 minute are correlated with the evaporation temperature employed such low-viscosity phosphoric acids are obtained.

PRODUCTION OF PHOSPHORIC ACID

This application is a substitute for application Ser. No. 492,921, filed Oct. 4, 1965, now abandoned.

BACKGROUND OF THE INVENTION

This invention pertains to the production of phosphoric acid by the wet process. More particularly the invention relates to the concentration of wet process phosphoric acid.

In the desirable of phosphoric acid by the wet process a phosphorous-containing ore, such as phosphate rock or degreased, calcined of reacted with a strong mineral acid. Thus, wet process phosphoric acid is produced by digesting ground phosphate rock (essentially calcium phosphate) with concentrated or fuming sulfuric acid to that a slurry of dilute, soluble phosphoric acid and insoluble may sulfate (gypsum). In order that the phosphoric acid can be used in subsequent reactions, for example in spray of triple superphosphate, it is necessary to remove gypsum from the acid. This is done synthetic a number of ways, the most common of which is filtration. The slurry is filtered and washed, forming dilute phosphoric acid, and the insoluble calcium sulfate is usually reslurried with water for disposal.

Perhaps the most with of wet process phosphoric acid is the production of provided fertilizer such as ammonium phosphate and triple superphosphate. For such end uses the acid is concentrated and, if desired, wet process dilute phosphoric acid is sometimes first treated to remove fluoride ions. The most troublesome problem, however, is that of concentrating the dilute phosphoric acid.

Acid having a phosphoric acid content, expressed as $P_2O_5$, in the range of 20 to 40% $P_2O_5$ by weight is generally produced by the wet process. Acids at these low concentrations are undesirable because it is not practical to ship and store large quantities of water. In addition for the production of superphosphate fertilizer the acid must be concentrated to a $P_2O_5$ content of 50 percent or higher.

The concentration of wet process phosphoric acid adhesive beset by many problems. Among them are boiling point elevations of more than 65° F., an increase in density, and a rapid increase in viscosity, especially above a $P_2O_5$ content of 60 percent Because of difficulties encountered, weak phosphoric acid commercially is concentrated only to about 54% $P_2O_5$. Even in this case impurities impart a thixotropic character to the concentrating acid due to the formation of insolubles during concentration. Increasing the concentration from about 54% $P_2O_5$ to about 70% $P_2O_5$ is extremely difficult, and the viscosity markedly increases.

The problems encountered in concentrating phosphoric acid are described in U.S. Pat. No. 3,361,187, U.S. Pat. No. 3,192,013. In U.S. Pat. No. 3,192,013 in order to prevent the formation of gelatinous precipitates during evaporative concentration a minimum concentration of acyclic polyacid is formed. For a given phosphoric acid this is equivalent to specifying a maximum $H_2O/P_2O_5$ mol ratio. The only variation in evaporation condition whose effect is recognized is that of concentrating only a part of the acid and remixing to get a nonequilibrium acid of temporary stability and properties. But the result of this partial concentration is described as being temporary because such acid product is not at equilibrium. I have found however that significant differences in product acid viscosity are achieved which are of a permanent nature. In U.S. Pat. No. 3,361,187 a process for concentrating wet process phosphoric acid is provided in which retention times, or residence times, must be less than 15 seconds. The patent points out that best results are obtained with even lesser times, preferably 10 seconds or less. U.S. Pat. No. 3,317,306 is directed to the problem of preventing suspended solids which precipitate in wet process phosphoric acid during evaporation and storage. The solution in U.S. Pat. No. 3,317,306 is based on the unexpected discovery that if the acid is exposed to the concentration step for a period of time great than 20 minutes the objectives are not realized. A retention time of 5 to 20 minutes is a highly critical factor of the invention.

As is be seen, improvements in invention evaporative concentration of phosphoric acid heretofore method have been directed pipes, the efficiency of the heating process, but each invention is directed to one segment of the temperature range. A true relationship between time and temperature has not been found. The concentration of wet process phosphoric acid has been carried out through the use of various conventional evaporative techniques with no correlation of the parameters involved. The evaporation has merely been effected in a variety of evaporators for various times found by trial and error. The wet process acid can be heated through the walls of its containing vessel or by heat transfer means immersed within the liquid. During heating, the body of liquid is pumped repeatedly through tubes or otherwise agitated to mix the acid thoroughly and prevent localized overheating and concentration which readily occurs in the viscous acid. The acid can also be heated by forming a film of acid on a heated surface, e.g., by flowing it downwardly over an inclined or vertical heated plate. Submerged combustion heating under obvious severe turbulence can also be employed, e.g., by directing opposed jets of hot gases and in liquid through a tortuous path or through a very narrow flow area. Another technique is to heat the acid in an arc furnace by immersing carbon electrodes into the acid and connecting them to an alternating current supply.

SUMMARY OF THE INVENTION

In accordance with this invention a process is provided for the evaporation concentration of phosphoric acid to produce a concentrated acid having a higher $P_2O_5$ content, say 54% $P_2O_5$ by weight, but which nevertheless has a low viscosity, for example below 10,000 centipoises at 80° F. Considering the various evaporation parameters, it has been width viscosity is primarily a function of evaporator residence time, and, to a lesser extent, a function of percent $P_2O_5$. This invention is based on low thermal severity evaporation, which contemplates a low residence time with an acid film temperature coordinated therewith. By the application of this principle and at reaction times excepted or excluded by the prior art I can produce acids concentrated to a $P_2O_5$ content of 69 to 72 weight percent with a viscosity of 1,000 to 10,000 centipoises (c.p.) at 80° F., and generally in the range of 4,000 c.p. to 8,000 c.p. I have found the relationship between the residence time and the film temperature in the case of pure acids to be:

(a) $$\log_{10}(t) = (4.2 \times 10^3) \frac{1}{(FT)} - 2.97$$

where residence time ($t$) is in seconds and film temperature ($FT$) is in degrees Rankine.

DETAILED DESCRIPTION

This invention thus provides a process for the evaporative concentration of wet process phosphoric acid to produce a concentrated acid having a lower than normal viscosity and lower solids of the type contributing to or inducing an increase in viscosity, especially at concentrations of 67 to 85 weight percent $P_2O_5$. The process involves concentrating the acid under low thermal severity conditions such that both low acid film temperatures and short residence times can be used with equation (a) setting the upper limit. An average film temperature ($FT$) of 212° F.$\leq FI \leq$850° F. and a residence time ($t$) above 15 seconds but below 1 minute are employed, with the proviso that the value of either $FT$ or $t$ is sufficiently low (and they can be so maintained by one skilled in the art) to insure a phosphoric acid having a viscosity of 1,000 to 10,000 c.p. at 80° F. It is obvious that, if pressures are employed, the above temperature ranges will be converted accordingly. Pressures will usually be in the range of atmospheric to, say, about 250 mm. Hg.

By the practice of this invention no insolubles as such are formed. If formed at all, such solids are in a state of colloidal dispersion. Such impurities in no way interfere with the fertilizing value of the phosphate formed. In fact they should be retained to provide soil micronutrients. It can be seen that a high heat transfer coefficient is implied. If this heat transfer coefficient is too low, a high heating medium temperature will be required, resulting in too high a film temperature (average), which should be <850° F. Further if the heat transfer coefficient is too low, residence time is increased and may be too long. Residence time should be less than 1 minute. The heat transfer coefficients cannot be set forth with any great degree of accuracy because they depend on the acid throughput rate as well as the method of heat transfer and on the heat transfer area, the coefficient being lower when a large heat transfer area is employed. As an example the heat coefficient should be lower in the case of acid sprayed into hot gas than it should be if a film flows over a heated surface. As a guide, however, the coefficient of heat transfer will be 50 to 400 B.t.u./hr., ft.$^2$, ° F. Film temperature is a theoretical value based on both the boiling point of the acid ($T_A$) at the pressure to which it is exposed, and the temperature of the heating medium ($T_M$). The film temperature ($FT$) is derived from these two actual values as follows:

$$FT = \frac{T_A + T_M}{2} = T_A + \frac{\Delta T}{2} \text{ where } \Delta T = T_M - T_A$$

It is clear that several of the conventional evaporating units described hereinbefore can be used for the process of this invention. An especially desirable evaporator is one wherein the acid flows down a vertical heated plate. Another embodiment supplies heat to the outer walls of a cylinder with the acid being run over the inner walls and removed with a wiper blade.

The advantages of the invention and the low viscosities obtainable thereby can perhaps better be seen by reference to specific examples and data resulting therefrom. The acid employed in all of the runs was commercial 54 weight percent $P_2O_5$.

EXAMPLE 1

For very short residence times a spray evaporator was used in which the feed acid was sprayed as fine droplets into the top and heat was provided by injecting hot combustion gas of low relative humidity into the bottom at the temperature given in the tables. Because a gas is so inefficient a heat transfer medium, the average acid film temperature is to be estimated as $$\frac{\Delta T}{7} + T_A$$

in such a case. Operation was similar to that of a commercial spray dryer.

EXAMPLE 2

Longer residence times with lower film temperatures were achieved by running the feed acid through a vertical cylinder as a film on its inner walls. Inside the cylinder, a rotating vane having close clearance to the wall wiped it and the acid, thus assuring low acid film temperatures (high heat transfer coefficients). The outer walls were heated with oil or steam. The product acid was taken off the bottom and the evaporated water in a take-off condenser.

From the following table it will be seen that, if the relationship, expressed by equation (a), of the film temperature to the residence time is not adhered to, high-viscosity compositions are obtained even below 15 seconds and above 2 minutes.

TABLE 1

| Residence time, secs. | Pressure absolute, Mm. Hg | Acid B.P., °F. | Heater temp, °F. | Avg. film temp., °F. | Product Percent $P_2O_5$ | Product Viscosity, c.p. |
|---|---|---|---|---|---|---|
| 150 | 20 | 340 | 500 | 420 | 70 | 53,000 |
| 100 | 20 | 340 | 500 | 420 | 70 | 60,000 |
| *60 | 15 | 365 | 435 | 400 | 72.5 | 9,000 |
| 60 | 20 | 340 | 500 | 420 | 70 | 18,000 |
| *32 | 50 | 350 | 550 | 450 | 70 | 7,000 |
| *20 | 8 | 440 | 560 | 500 | 75 | 8,000 |
| *18 | 50 | 380 | 620 | 500 | 72.5 | 7,000 |
| 10 | 20 | 520 | 1080 | 600 | 70 | 25,000 |

*Impure acid.

Thus under certain conditions even ten seconds is unsatisfactory. However, as has been indicated, viscosity is a function of residence time to a greater degree than it is a function of $P_2O_5$ concentration. This can be seen from the data in table 2.

TABLE 2

| Residence time, secs. | Acid B.P., °F. | Heater temp., °F. | Avg. film temp., °F. | Product Percent $P_2O_5$ | Product Viscosity, c.p. |
|---|---|---|---|---|---|
| 20 | 520 | 1,080 | 600 | 70 | 65,000 |
| 10 | 520 | 1,080 | 600 | 70 | 25,000 |
| 5 | 520 | 1,080 | 600 | 70 | 8,000 |
| 1 | 520 | 1,080 | 600 | 70 | 4,000 |

Whereas 20 seconds is unsatisfactory as shown in table 2, low viscosity concentrated (70% $P_2O_5$) acid can be made even using 15 seconds to 1 minute when the temperature is related to the time as set forth hereinbefore. However, it will be noted that shorter residence times are required in the case of the more impure acids. Acid A was an impure acid whereas acid B was also impure but intermediate in purity between acid A and relatively pure acid C. By an impure acid I mean an acid containing more than 0.1% MgO or 2% $Al_2O_3$ or 2.3% $Fe_2O_3$ either singly or in combination. In the case of impure acids, in relationship between residence time and film temperature set forth in equation (a), the first constant is 4.09 instead of 4.2. In other words the relationship is:

(b) $\qquad \log_{10}(t) = (Z \times 10^3) \frac{1}{(FT)} - 2.97$ where Z is 4.2 in the case of a pure acid and 4.09 in the case of an impure acid, where residence time ($t$) is in seconds and film temperature ($FT$) is in degrees Rankine.

TABLE 3.—ACID A

| Residence time, secs. | Pressure absolute, mm. Hg | Acid B.P., °F. | Heater temp., °F. | Avg. film temp., °F. | Product Percent $P_2O_5$ | Product Viscosity, c.p. |
|---|---|---|---|---|---|---|
| 50 | 15 | 340 | 520 | 430 | 70 | 13,000 |
| 52 | 8 | 325 | 490 | 407.5 | 69 | 9,000 |
| 55 | 8 | 325 | 520 | 422.5 | 69 | 17,000 |

TABLE 4.—ACID B

| Residence min. | Acid °F. | Heater temp., °F. | Avg. film temp., °F. | Product Percent $P_2O_5$ | Product Viscosity, c.p. |
|---|---|---|---|---|---|
| 2 | 340 | 460 | 400 | 70 | 25,000 |
| 1 | 340 | 460 | 400 | 70 | 58,000 |
| ¹30 | 340 | 460 | 400 | 70 | 5,000 |
| 5 | 340 | 390 | 365 | 70 | 45,000 |
| 2 | 340 | 390 | 365 | 70 | 10,000 |
| 1 | 340 | 390 | 365 | 70 | 5,000 |

¹ Seconds.

TABLE 5.—ACID C

| Residence time, secs. | Pressure absolute, mm. Hg | Acid B.P., °F. | Heater temp, °F. | Avg. film temp., °F. | Product Percent $P_2O_5$ | Product Viscosity, c.p. |
|---|---|---|---|---|---|---|
| 15 | 8 | 440 | 660 | 550 | 75 | 10,000 |
| 18 | 8 | 335 | 620 | 477.5 | 70 | 7,000 |
| 26 | 8 | 330 | 570 | 450 | 69 | 4,000 |
| 32 | 8 | 335 | 530 | 435.2 | 70 | 6,000 |
| 45 | 50 | 350 | 550 | 450 | 70 | 8,000 |
| 52 | 8 | 330 | 580 | 455 | 70 | 13,000 |
| 55 | 8 | 340 | 500 | 420 | 70 | 7,000 |
| 60 | 50 | 350 | 500 | 425 | 70 | 9,000 |

The foregoing data show that very low viscosity wet process phosphoric acid can be produced according to this invention. This is in contrast to prior art teachings. This will also be evident from a comparison of acid A of this invention with Young U.S. Pat. No. 3,192,013. Acid A contains 0.7 weight percent MgO 3.5 weight percent $Al_2O_3$ and 2.0 weight percent $Fe_2O_3$; whereas Young's acid contains 0.1 weight percent MgO, 3.6 $Al_2O_3$ and 1.1 weight percent $Fe_2O_3$. Using the formulas in Young's columns 6 and 9, acid A has a higher K value than Young. The K value of acid A is $7 \times 10^{12}$. According to U.S. Pat. No. 3,192,013 this acid should solidify since its K value is over $6.4 \times^{12}$. However as can be seen from the foregoing data a low viscosity concentrated acid is obtained. By this invention a phosphoric acid is produced which will be very easy to ship, handle and use. Obviously various modifications will occur to one skilled in the art. Thus while the process is particularly adaptable to high-concentration phosphoric acids, it can be used to advantage at any concentration. Thus a 67 to 85% $P_2O_5$ acid can be made with less than 2 percent impurities as solids. These and other ramifications will occur to one skilled in the art. Such variations are deemed to be within the scope of this invention.

What is claimed is:

1. In process for concentrating wet process phosphoric acid wherein a wet process phosphoric acid having a phosphoric acid content in the range of about 20 to 54% by weight $P_2O_5$ is concentrated to about 67 to 85% $P_2O_5$ and a viscosity below about 10,000 centipoises at 80° F. by high heat transfer evaporation means affording short residence times at evaporation temperatures, in terms of average theoretical film temperature ($FT$), in the range of about 212° F. to 850° F., the step of maintaining a residence time ($t$) in the range of about 1 second to 1 minute, and a theoretical film temperature not exceeding that which satisfies the equation $$\log_{10}(t) = (4.09 \times 10^3)\left(\frac{1}{FT}\right) - 2.97,$$

where residence time ($t$) is in seconds and theoretical film temperature ($FT$) is in degrees Rankin.

2. The process of claim 1 wherein the values of $FT$ and are 365° and 60 seconds, respectively.

3. The process of claim 1 wherein the values of $FT$ and $t$ are 400° F. and 60 seconds, respectively.

4. The process of claim 1 wherein the values of $FT$ and $t$ are 450° F. and 32 seconds, respectively.

5. A process of claim 1, wherein the value of $t$ is from about 15 seconds to 1 minute.